US012027065B2

(12) United States Patent
Purvis

(10) Patent No.: US 12,027,065 B2
(45) Date of Patent: Jul. 2, 2024

(54) BIOMECHANICAL MODEL

(71) Applicant: Thomas C Purvis, Oklahoma City, OK (US)

(72) Inventor: Thomas C Purvis, Oklahoma City, OK (US)

( * ) Notice: Subject to any disclaimer, the term of this patent is extended or adjusted under 35 U.S.C. 154(b) by 660 days.

(21) Appl. No.: 17/225,480

(22) Filed: Apr. 8, 2021

(65) Prior Publication Data

US 2021/0319719 A1 Oct. 14, 2021

Related U.S. Application Data

(60) Provisional application No. 63/007,443, filed on Apr. 9, 2020.

(51) Int. Cl.
*G09B 23/32* (2006.01)
*G09B 23/34* (2006.01)

(52) U.S. Cl.
CPC .............. *G09B 23/32* (2013.01); *G09B 23/34* (2013.01)

(58) Field of Classification Search
CPC ........ G09B 23/30; G09B 23/32; G09B 23/34; A63H 3/46; A63H 7/02; A63H 11/06; A63H 11/10; A63H 11/14; A63H 11/18
USPC ........ 434/267, 274, 275; 446/308, 309, 312, 446/317, 371, 375, 377, 379, 380, 381, 446/383
See application file for complete search history.

(56) References Cited

U.S. PATENT DOCUMENTS

| | | | |
|---|---|---|---|
| 4,041,638 A | 8/1977 | Knibbs | |
| 4,701,132 A | 10/1987 | Groesch et al. | |
| 4,850,877 A * | 7/1989 | Mason | G09B 23/30 434/274 |
| 4,989,862 A * | 2/1991 | Curtis | A63B 69/0071 473/448 |
| 6,532,400 B1 * | 3/2003 | Jacobs | F15B 11/20 318/568.17 |
| 6,769,286 B2 | 8/2004 | Biermann et al. | |
| 7,384,268 B2 * | 6/2008 | Browne-Wilkinson | G09B 23/32 434/274 |

(Continued)

OTHER PUBLICATIONS

Screen captures from YouTube video entitled "Suats Part 1: Fold-Ability and Proportions", 10 pages, uploaded Feb. 2, 2015, by user "PersonalTrainingdotcom". Retrieved from https://youtu.be/Av3LO2GwpAk.

*Primary Examiner* — Joseph B Baldori
(74) *Attorney, Agent, or Firm* — Sean O'Connell, PLLC

(57) ABSTRACT

A biomechanical body model for illustrating body mechanics. The body model includes components representing the torso, upper leg, and lower leg which can be altered in length to represent the variations in human segmental proportions and their combined influences on an individual's mechanical ability to move between a standing position and a seated or squatting position. Manipulation of these variables is further influenced by a range of available mobility of respective joints interconnecting the body segments. Outcomes of permutations of both the variations in segmental proportions and joint mobility is further influenced by variations in the relative plane of gross lower extremity motion as demonstrated by manipulation of a secondary hip axis. The system also incorporates various muscle segments to demonstrate impact of body movements on muscles and restrictions that muscles may present for body movements.

2 Claims, 2 Drawing Sheets

(56) References Cited

U.S. PATENT DOCUMENTS

| | | | |
|---|---|---|---|
| 7,699,615 B2* | 4/2010 | Sakezles | G09B 23/28 434/274 |
| 8,425,234 B2* | 4/2013 | Sakezles | G09B 23/32 434/274 |
| 8,469,715 B2 | 6/2013 | Ambrozio | |
| 9,097,325 B2* | 8/2015 | Zhu | B62D 57/02 |
| 9,283,673 B2* | 3/2016 | Godowski | B25J 9/106 |
| 2005/0059908 A1* | 3/2005 | Bogert | A63B 21/055 601/5 |
| 2010/0185301 A1* | 7/2010 | Hansen | A61F 2/70 623/47 |
| 2011/0027767 A1* | 2/2011 | Divinagracia | G09B 23/32 434/274 |
| 2011/0066088 A1* | 3/2011 | Little | A61H 3/00 601/35 |
| 2011/0297461 A1* | 12/2011 | Miyazaki | B62D 57/032 901/1 |
| 2014/0190289 A1* | 7/2014 | Zhu | B62D 57/02 74/89.22 |

\* cited by examiner

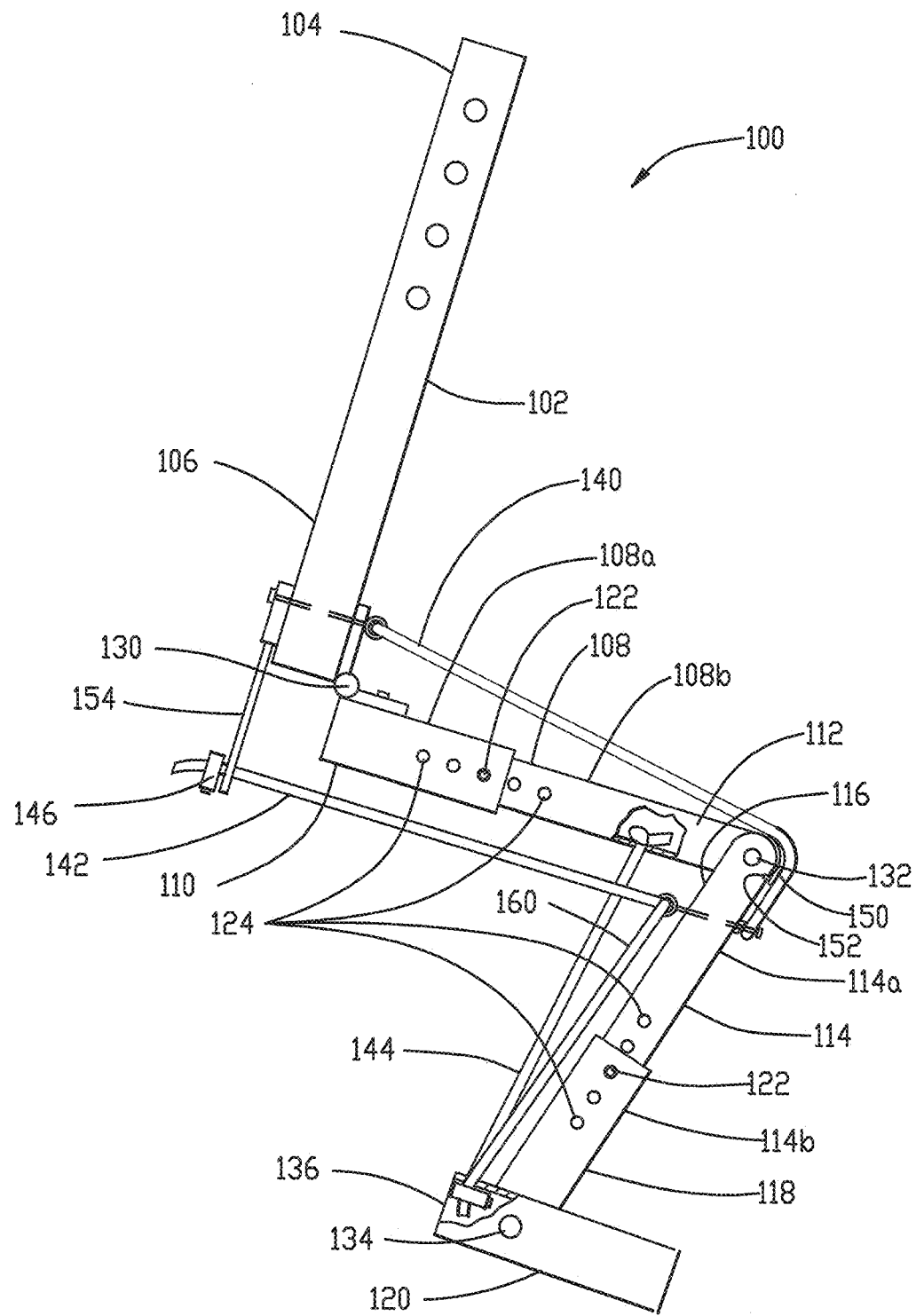

BIOMECHANICAL MODEL

FIELD OF THE INVENTION

The present invention relates to biomechanical models of and more particularly to biomechanical models for demonstrating body mechanics during exercise movements.

SUMMARY OF THE INVENTION

The biomechanical body model of the present invention comprises components representing the torso, upper leg, and lower leg which can be altered in length. Additionally, a series of elastomers are attached at points consistent with that of musculoskeletal anatomical attachments. While single joint muscles can be simulated, attachment points are primarily representative of lower extremity biarticular/multi-joint/two-joint muscles. These elastomers show the both the influences of various combinations of joint positions and motions upon the involved muscles, and the influences of the associated muscles upon the respective joints during both single and multiple joint activities. In such activities one joint (e.g., the hip) may be held static while another, which is crossed by the same muscles (e.g., the knee) moves. The exact position of the static joint plays a role in the muscles' ability to influence the second joint.

The present invention comprises a biomechanical body model comprising a torso segment having a top end and a bottom end, an upper leg segment having a first end and a second end, a lower leg segment having an upper end and a lower end, and a foot segment. The body model further comprises a hip joint connected to the bottom end of the torso segment and the upper leg segment, a knee joint connected to the upper leg segment and the lower leg segment, an ankle joint connected to the lower leg segment and the foot segment, and at least one multi-joint muscle, the at least one multi-joint muscle comprising an elastomer.

BRIEF DESCRIPTION OF THE DRAWINGS

FIG. 2 is a side elevation view of the model of FIG. 1 in an alternative configuration.

DETAILED DESCRIPTION

Figure 1:
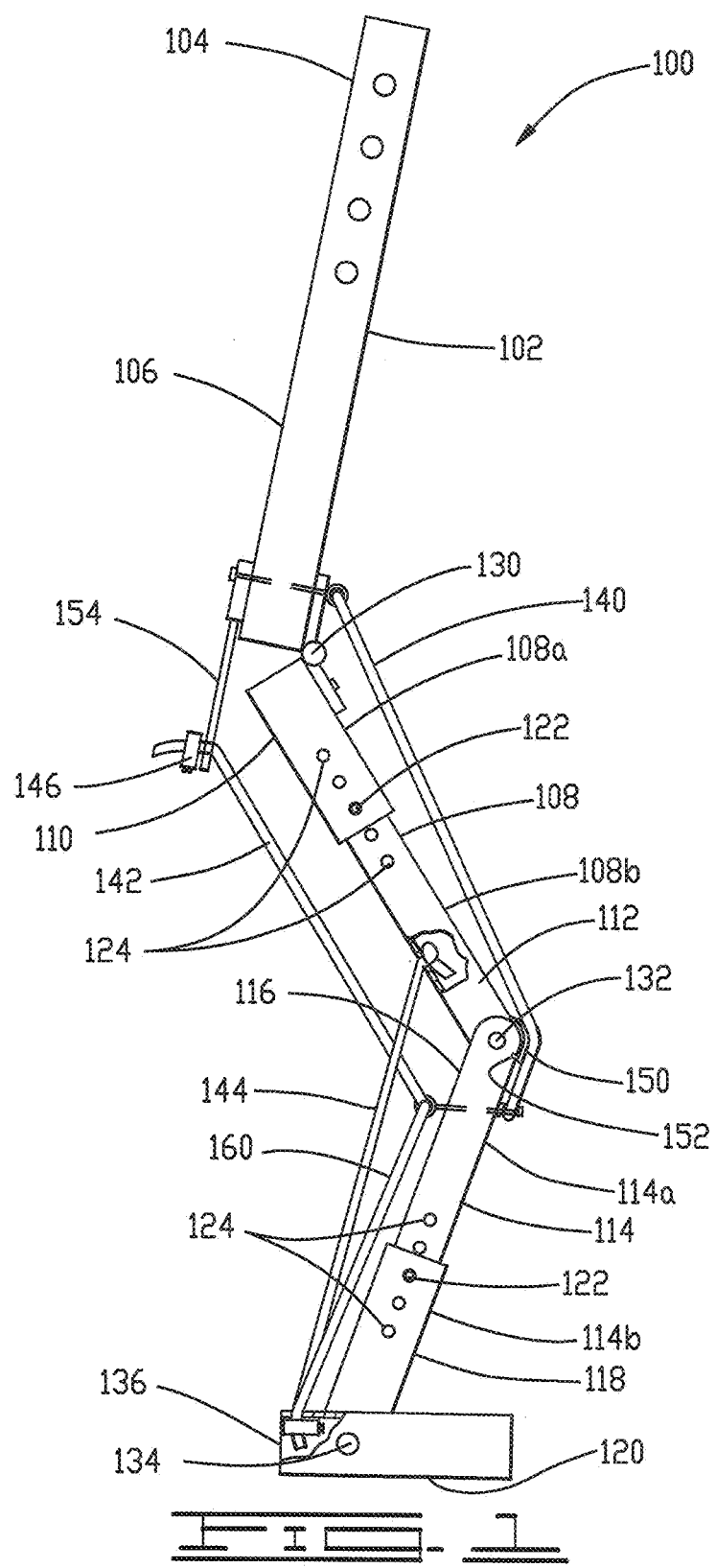
FIG. 1 is a side elevation view of a biomechanical body model constructed in accordance with a preferred embodiment of the present invention.

Personal trainers, physical therapists, healthcare professionals, and other exercise professionals regularly work with individuals to improve health through exercise and activities of daily living. Understanding exercise mechanics, including the combined influences of an individual's idiosyncratic skeletal proportions, joint limitations, and choices of exercise set-up and execution can be critical to exercise outcomes and proper exercise techniques. An innovative biomechanical model capable of simultaneously manipulating the combinations and joint positions and motions consistently and viewing the associated changes in muscular relationships can be advantageously used to demonstrate how various exercise movements can impact various joints, muscles, and overall ability to perform an activity. The embodiments of the present invention are particularly useful for demonstrating exercise mechanics of squats, knee flexion/extension, hip flexion, ankle exercises, as well as other related activities and functional movements of daily living.

With reference now to the drawings and to FIG. 1 in particular, there is shown therein a biomechanical body model, designated by reference numeral 100, in accordance with a preferred embodiment of the present invention. The body model 100 of the employs the use of multi-joint muscles to illustrate muscle actions in response to certain mechanical body movements. The biomechanical model 100 comprises a plurality of representative body segments connected by a plurality of representative joints. As illustrated the plurality of body segments comprises a torso segment 102 having a top end 104 and a bottom end 106, an upper leg segment 108 having a first end 110 and a second end 112, a lower leg segment 114 having an upper end 116 and a lower end 118, and a foot segment 120. In the preferred embodiment at least one of the upper leg segment 108 and the lower leg segment 114 are extendable, having an adjustable length. Preferably the segments 108 and 114 are comprised of at least two longitudinal pieces. More preferably the longitudinal pieces comprise a first longitudinal piece of square tubing 108a and 114a and a second longitudinal piece 108b and 114b. Most preferably the first piece 108a and 114a and the second piece 108b and 114b are telescopically arranged relative to each other. Alternatively, the segments 108 and 114 may be comprised of a plurality of elongate plates, angle iron, or other structures that may be secured together in a manner allowing a length of the segments to be adjusted.

Continuing with FIG. 1, the first piece 108a and the 114a is secured to the second piece 108b and 114b with an adjustable connection 122. Preferably the adjustable connection 122 comprises spring clip push button fasteners in slots 124 along a length of the first piece 108a and 114a and the second piece 108b and 114b. Alternative adjustment connections such as pins, bolts, or clamps are contemplated. The adjustable nature of the upper leg segment 108 and the lower leg segment 114 allows the biomechanical model 100 to additionally be adjusted to represent variations in skeletal proportions as desired.

The model of FIG. 1 further comprises a hip joint 130 between the torso segment 102 and the upper leg segment 108, a knee joint 132 between the upper leg segment 108 and the lower leg segment 114, and an ankle joint 134 between the lower leg segment 114 and the foot segment 120. The hip joint 130 is preferably connected to the bottom end 106 of the torso segment 102 and the first end 110 of the upper leg segment 108. More preferably the hip joint 130 is a multi-axial hinge, representing a multiaxial joint permitting relative movement of the upper leg segment 108 in multiple directions relative to the torso segment 102. The multiaxial hinge permits rotation about a first axis and also enables rotation about a second axis that is orthogonal to the first axis. It will be appreciated that the hip joint 130 permits an acute or obtuse angle between a front side of the torso segment 102 and a top side of the upper leg segment 108. Similarly, the hip joint 130 permits a reflex angle between a back side of the torso segment 102 and a bottom side of the upper leg segment 108.

The knee joint 132 is preferably connected to the second end 112 of the upper leg segment 108 and the upper end 116 of the lower leg segment 114. The knee joint 132 preferably comprises a single axis joint. More preferably the knee joint 132 comprises a hinge or rotating pin arrangement permitting rotation about a single axis. It will be appreciated that the knee joint 132 permits an acute angle to be formed between the bottom side of the upper leg segment 108 and the back side of the lower leg segment 114; while a reflex angle is created between the top side of the upper leg segment 108 and a front side of the lower leg segment 114. The ankle joint 134 is preferably connected to the lower end 118 of the lower leg segment 114 and to a rear portion 136 of the foot segment 120. The ankle joint 134 also preferably comprise a hinge or pin arrangement permitting rotation about a single axis.

Continuing with FIG. 1, the biomechanical model 100 further comprises a plurality of multi-joint muscle segments 140, 142, and 144. The muscle segments 140, 142, and 144 preferably comprise an elastomer, such as a bungee cord, an elastic band, or other stretchable cord. The elastomers are preferably secured to the body segments to a through bore in the body segments using a cord lock 146, thus allowing a tension or useable length of the elastomer to be adjusted. Alternatively, the elastomers may be knotted or tied to eyebolts or through bores in the body segments.

Preferably the muscle segments comprise at least one multi-joint muscle. More preferably, the plurality of muscle segments will comprise a quadricep muscle 140, a hamstring muscle 142, and a calf muscle 144. Preferably the quadricep muscle 140 is attached at a first end to the bottom end 106 of the torso segment 102 and at a second end to the upper end 116 of the lower leg segment 114. More preferably, the quadricep muscle 140 will pass through the acute or obtuse angle of the hip joint 130, adjacent the top side of the upper leg segment 108, and through the reflex angle of the knee joint 132.

The body model 100 of the instant embodiment may also comprise a patella segment 150 removably connected to the upper end 116 of the lower leg segment 114 and adjacent the knee joint 132. The patella segment 150 preferably comprises a curved plate and a tab 152 extending from a first end of the plate. The tab 152 of the plate is preferably inserted into a slot in the upper end 116 of the lower leg segment 114 to position the patella segment. Alternatively, the tab 152 of the patella segment 150 may be positioned for insertion in a slot in the second end 112 of the upper leg segment 108. Additionally, the patella segment 150 may be secured in place with a hinge or positioned to retract into the upper leg segment 108 or the lower leg segment 114. The patella segment 150 understandably represents a knee of the body and allows the quadricep muscle 140 to smoothly pass through the reflex angle of the knee joint 132. The removable nature of the patella segment 150 allows additional demonstration of impact of body mechanics on the quadricep muscle 140. Additionally the position of the patella segment allows for the quadricep muscle passes across and contacts the patella segment.

Similarly, the hamstring muscle 142 preferably is attached at a first end proximate the bottom end 106 of the torso segment 102 and at a second end to the upper end 116 of the lower leg segment 114. Preferably the body model 100 may comprise a tail bone 154 secured to the bottom end 106 of the torso segment 102, providing a more direct connection point for the first end of the hamstring muscle 142. More preferably, the hamstring muscle 142 will pass through the reflex angle of the hip joint 130, along the bottom side of the upper leg segment 108, and through the acute or obtuse angle of the knee joint 132. The calf muscle 144 is preferably connected at a first end to the second end 112 of the upper leg segment 108 and at a second end to the rear portion 136 of the foot segment 120. More preferably, the calf muscle 142 passes through the acute or obtuse angle of the knee joint 132, along the back side of the lower leg segment 114, and to the foot segment 120.

Continuing with FIG. 1, the body model 100 may further comprise at least one single joint muscle 160. The single joint muscle 160 may comprise an elastomer representing the human soleus muscle as shown in FIG. 11 crossing only the ankle joint 134. The soleus single joint muscle 160 is connected at a first end to the upper end 116 of the lower leg segment 114 and at a second end to the rear end 136 of the foot segment 120. Use of the single joint muscle 160 allows for direct comparison to the adjacent multi-joint calf muscle 144, for recognition of the impact of body mechanics on the various muscles. It will be appreciated that other single joint muscles could similarly be implemented.

Turning now to FIG. 2, the body model 100 of FIG. 1 is shown in an alternative configuration. The purpose of the body model 100 is demonstrated therein, showing effects of example body movements on various body segments 102, 108, and 114, joints 130, 132, and 134, and muscles 140, 142, and 144. In the configuration illustrated in FIG. 2 the body model 100 is shown in a squatted position as compared to the more upright position of FIG. 1 to demonstrate variations in body positions on joints and muscles. For example, in the position of FIG. 2 the hamstring muscle 142 is longer than in the body model 100 position of FIG. 1. It will be appreciated that various movements and positions of the body model 100 will allow demonstration of similar changes to other muscles as well as body segments or joints.

Various modifications can be made in the design and production of the present invention without departing from the spirit thereof. Thus, while the principal preferred construction and use of the invention have been explained in what is now considered to represent its best embodiments, it should be understood that the invention may be practiced otherwise than as specifically illustrated and described, and claimed in the following claims.

What is claimed is:

1. A biomechanical model comprising:
a torso segment having a top end and a bottom end,
an upper leg segment having a first end and a second end;
a lower leg segment having an upper end and a lower end;
a foot segment;
a hip joint connected to the bottom end of the torso segment and the upper leg segment;
a knee joint connected to the upper leg segment and the lower leg segment;
an ankle joint connected to the lower leg segment and the foot segment;
at least one multi-joint muscle, the at least one multi-joint muscle comprising an elastomer; and
a patella segment connected adjacent the knee segment;
wherein the patella segment is removably connected to the upper end of the lower leg segment; and
wherein the patella segment comprises:
a curved plate; and
a tab extending from a first end of the plate;
wherein the tab of the patella segment is inserted in a slot at the upper end of the lower leg segment.

2. The biomechanical model of claim 1 wherein the at least one multi-joint muscle comprises a quadricep muscle, the quadricep muscle having a first end connected to the bottom end of the torso segment and having a second end connected to the upper end of the lower leg segment;
such that the quadricep muscle passes across and contacts the patella segment.

* * * * *